E. MARTIN.
Cartridge.
No. 48,820. Patented July 18, 1865.
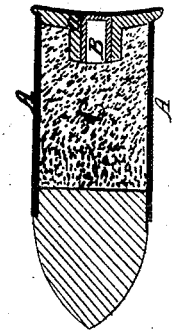
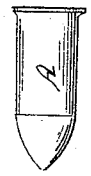
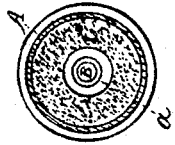

UNITED STATES PATENT OFFICE.

EDWIN MARTIN, OF SPRINGFIELD, MASSACHUSETTS.

IMPROVEMENT IN PRIMING METALLIC CARTRIDGES.

Specification forming part of Letters Patent No. 48,820, dated July 18, 1865.

*To all whom it may concern:*

Be it known that I, EDWIN MARTIN, of Springfield, Hampden county, Commonwealth of Massachusetts, have invented an Improved Cartridge; and I do hereby declare that the following is a full and exact description thereof, reference being had to the accompanying drawings, and to letters of reference marked thereon.

In the drawings, Figure 1 shows the cartridge of the ordinary size for musket. Fig. 2 is an enlarged cross-section, and Fig. 3 an enlarged longitudinal section of the same.

Its construction is as follows:

In the bottom of the ordinary shell, A, I place a circular piece of metal, $a$, fitting the inside of the shell. In the center of this metallic piece, I place a small glass cup, B. In this cup is placed the fulminate, of mercury, by the explosion of which the powder in the shell at C is fired. This shell, it will be seen, is of the kind known as "center-firing," the hammer striking the center of the rear end of the shell instead of on the rim, as they are now commonly made.

I do not wish to claim this arrangement as new, but the object of my invention is to obtain a cartridge which shall be easily fired and not easily exploded accidentally, and which will keep in good order in any climate and for any length of time. By the corrosive action of the fulminate on the shell when placed in the rim or upon any metallic surface with which it comes in contact, its force is lost and often cartridges which have been made for a considerable length of time are rendered entirely useless.

Now, by inclosing the fulminate in the glass cup B, it being surrounded by a non-corrosive substance on all sides except at the point where it comes in contact with the powder, it is impossible for it to become spoiled, and also by inclosing it in a glass cup I insure its firing more easily, as a slight blow on the center of the rear end of the shell is sufficient to break the glass and thus explode the fulminate and ignite the powder.

And by making the rear end of the shell concave or sunk in the center lower than the outside, it is protected from accidental blows by the projecting rim.

It is plain that any other convenient and economical vitreous substance than glass may be used and be held in place in any convenient way, and I do not wish to confine myself to any of these particulars; but What I do claim, and desire to secure by Letters Patent, is—

Inclosing the fulminate, of mercury or other substance used to ignite the powder in a cartridge by its explosion, in a glass or other vitreous substance, substantially in the manner and for the purpose described.

EDWIN MARTIN.

Witnesses:
J. B. GARDINER,
J. E. McINTIRE.